(12) United States Patent
Yerubandi et al.

(10) Patent No.: US 8,010,087 B2
(45) Date of Patent: Aug. 30, 2011

(54) MOBILE CARRIER CAPABILITY

(75) Inventors: Venkata Narasimha Rao Yerubandi, Sunnyvale, CA (US); Tong Zhu, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 866 days.

(21) Appl. No.: 11/894,483

(22) Filed: Aug. 20, 2007

(65) Prior Publication Data

US 2009/0052359 A1 Feb. 26, 2009

(51) Int. Cl.
H04M 3/42 (2006.01)
(52) U.S. Cl. ............... 455/414.1; 455/422.1; 455/424; 455/445; 455/560; 370/351; 370/401
(58) Field of Classification Search .... 455/414.1–414.3, 455/3.04, 422.1, 424, 445, 560; 370/255, 370/352, 401
See application file for complete search history.

(56) References Cited

U.S. PATENT DOCUMENTS

| 6,009,081 | A | * | 12/1999 | Wheeler et al. | ............... | 370/255 |
| 6,567,419 | B1 | | 5/2003 | Yarlagadda | | |
| 7,313,133 | B2 | | 12/2007 | Yarlagadda | | |
| 7,738,833 | B2 | * | 6/2010 | Bettis et al. | ................... | 455/3.04 |
| 2004/0032860 | A1 | | 2/2004 | Mundra et al. | | |
| 2004/0160979 | A1 | | 8/2004 | Pepin et al. | | |
| 2006/0083219 | A1 | * | 4/2006 | Paden et al. | ................... | 370/352 |
| 2006/0277271 | A1 | | 12/2006 | Morse et al. | | |
| 2006/0277308 | A1 | | 12/2006 | Morse et al. | | |
| 2007/0136279 | A1 | | 6/2007 | Zhou et al. | | |
| 2007/0270130 | A1 | * | 11/2007 | Gupta et al. | ............... | 455/414.1 |
| 2007/0270135 | A1 | * | 11/2007 | Gaschler | ................... | 455/414.3 |
| 2008/0031277 | A1 | * | 2/2008 | Walter et al. | ................... | 370/469 |

FOREIGN PATENT DOCUMENTS

| EP | 1 161 038 A2 | 12/2001 |
| WO | 01/78430 A1 | 10/2001 |

OTHER PUBLICATIONS http://www.way2sms.com/content/index.html.
http://www.160by2.com/.
http://www.techpersona.com/wp/2007/05/22/sms-advertising-in-india/.
http://mobilemarketinginthenews.blogspot.com/2007/06/way2sms-starts-off-new-era-in-mobile.html.
U.S. Appl. No. 11/833,173, filed Aug. 2, 2007.

* cited by examiner

Primary Examiner — Kamran Afshar
Assistant Examiner — Kathy Wang-Hurst
(74) Attorney, Agent, or Firm — Frommer Lawrence & Haug LLP; John W. Branch (57) ABSTRACT

A network device and method are directed towards determining whether a carrier gateway is likely to be associated with a mobile carrier service. Content/service providers receive request for content along with a network address of a gateway device providing the request. If the network address is unknown, the content/service provider may be provided to a new gateway identifier that is configured to determine a likelihood that the gateway device is configured to provide services to mobile devices. Based, in part, on the determined likelihood, a gateway device's capability may also be determined, such that the content/service provider may then select to provide a response, degrade a response, or reject a request for the content, service, or the like.

20 Claims, 4 Drawing Sheets

MOBILE CARRIER CAPABILITY

TECHNICAL FIELD

The present invention relates generally to mobile communications, and more particularly but not exclusively to determining a gateway carrier's capability using usage logs, as well as information from a variety of other sources, including, but not limited to gateway carriers, and/or third party providers.

BACKGROUND

In today's society, mobile devices are becoming increasingly more common. Many mobile devices, such as personal digital assistants, cellular phones, or the like, may be employed to communicate messages with another computing device, such as a desktop computer, a server, or the like. Moreover, users of such mobile devices may seek to obtain news, mail services, movies, music, or any of a variety of content over the Internet.

In a typical network configuration, a mobile device may communicate with various content/service providers through a mobile carrier's gateway device. As more mobile devices are used, however, the mobile carrier may need to add more gateway devices, or configure the gateway devices that they may currently employ. Information about such changes to the mobile carrier's services may be provided to the content/service providers. However, not all of the content/service providers may be information of new gateway devices that have entered service. In other instances, some of the content/service providers may not be provided such information for a period of time.

Because mobile devices may require modification of the content provided to them, including, for example, a rate in which the content might be provided, or the like, it is often relevant to the content/service providers to know whether a request is from a mobile device, or from another computing devices, such as a server, desktop computer, or similar land-based computing device.

A typical method in which a content/service provider knows whether a request is from a mobile device is based on a network address of the mobile carrier's gateway device. However, when the gateway device is unknown to the content/service provider, perhaps because it was reconfigured, or recently added by the mobile carrier service, the content/service provider may be unable to determine if the request is from a mobile device. Therefore, the content/service provider may be unable to adequately provide content in response to the request. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly, the present invention is directed towards determining whether a carrier gateway is likely to be associated with a mobile carrier service. Content/service providers may be configured to provide content, and/or a variety of services in response to a request that may be received through a network carrier's gateway device. When the request is received, a network address of the gateway device may also be received. The content/service providers may then employ the received network address to determine if the gateway device is likely to be employed to service requests from mobile devices. If the network address is unknown, the content/service provider may log the network address for additional analysis. In one embodiment, the content/service provider may select to reject the request from the unknown gateway device, provide a degraded service response, or any of a variety of other responses.

Logged unknown network addresses may then be provided to a new gateway identifier component that is configured to determine a network carrier associated with the gateway device. In one embodiment, the new gateway identifier component may employ a service such as whois, or the like, to learn about the network carrier associated with the gateway device. Based on various characteristics of the network carrier, including a name of a domain associated with the gateway device, and/or network carrier, the network carrier's characteristics, or the like, a likelihood determination is made as whether the gateway device is configured to provide services to mobile devices. In one embodiment, input from various third party consolidators for network carriers, as well as input from various network carriers themselves, may also be used to determine the likelihood that the gateway device provides services to mobile devices. Thus, information may be obtained from a variety of sources, and/or processed either in real-time (e.g., online), and/or in a delayed mode (e.g., offline, or batch processing).

Based, in part, on the determined likelihood, a gateway device's capability may also be determined. For example, where it is determined that a likelihood falls below some defined percentage for a particular service, content, or the like, the gateway device may further be so identified, such that the content/service provider may determine whether to provide the response, degrade a response, or reject a request for the content, service, or the like, although the gateway device may be configured to provide services to mobile devices.

Illustrative Operating Environment

Figure 1:
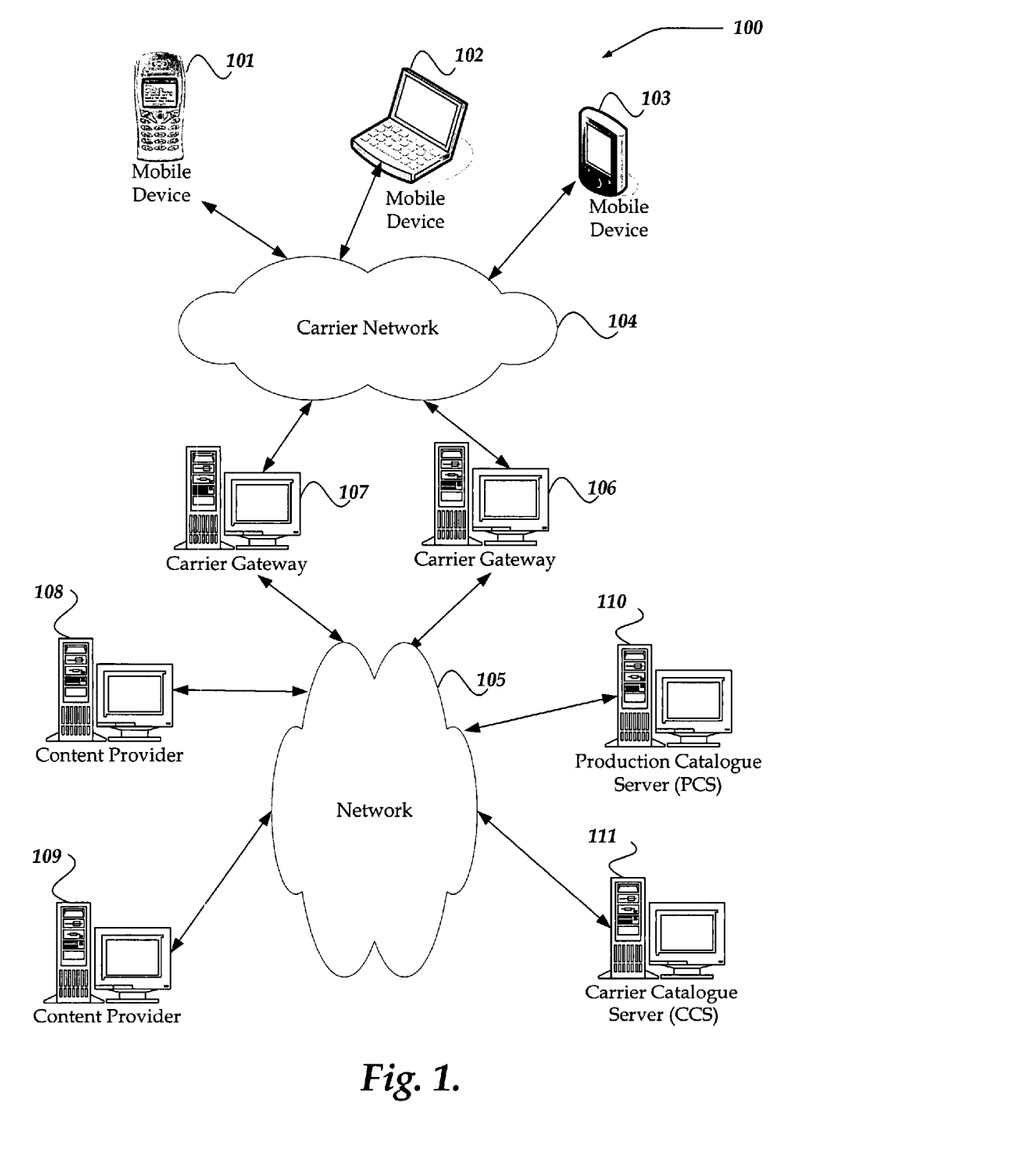
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes mobile devices 101-103, carrier network 104, carrier gateways 106-107, network 105, content providers 108-109, production catalogue server (PCS) 110, and carrier catalogue server (CCS) 111. Carrier network 104 is in communication with mobile devices 101-103 and carrier network 104. Network 105 is in communication with and enables communication between content providers 108-109, PCS 110, and CCS 111.

Generally, mobile devices 101-103 may include virtually any portable computing device capable of connecting to another computing device to send and receive a message. Such devices include cellular telephones, smart phones, display pagers, radio frequency (RF) devices, infrared (IR) devices, integrated devices combining one or more of the preceding devices, or the like. Mobile devices 101-103 may also include other devices, such as Personal Digital Assistants (PDAs), microprocessor-based or programmable consumer electronics, wearable computers, or the like. As such, mobile devices typically range widely in terms of capabilities and features. For example, a web-enabled mobile device may have a touch sensitive screen, a stylus, and several lines of color LCD display in which both text and graphics may be displayed. Moreover, the web-enabled mobile device may include a mobile browser application enabled to receive and to send wireless application protocol messages (WAP), or the like. In one embodiment, the mobile browser application is enabled to employ a Handheld Device Markup Language (HDML), such as Wireless Markup Language (WML), WMLScript, JavaScript, or the like, to display and send a message.

Mobile devices 101-103 may include a keyboard, mouse, speakers, a microphone, and an area on which to display information. Mobile devices 101-103 may further include low-end devices that may have limited storage memory, reduced application sets, low bandwidth for transmission of a communication, or the like.

Mobile devices 101-103 may provide a message, network packet, or the like, that includes a device identifier, such as a Mobile Identification Number (MIN). A MIN may include a North American Numbering Plan (NANP) number that is configured to serve as a mobile telephone number for mobile devices 101-103. MINs may be programmed into mobile devices 101-103 at time of manufacture, purchase, or the like. Mobile devices 101-103 is not limited to providing a MIN number as the device identifier, and another device identifier may also be provided, such as an electronic serial number (ESN), application serial number, or the like, without departing from the scope of the invention. Mobile devices 101-103 may further provide a phone number in addition to the device identifier. In one embodiment, mobile devices 101-103 includes a device identification component configured to provide the MIN, ESN, application serial number, phone number, or the like.

Mobile devices 101-103 may be configured to receive a message, such as through a Short Message Service (SMS), Multimedia Message Service (MMS), or the like, from the other computing device, or the like.

Carrier network 104 is configured to couple mobile devices 101-103 and its components with carrier gateways 106-107. Carrier network 104 may include any of a variety of wireless sub-networks that may further overlay stand-alone ad-hoc networks, or the like, to provide an infrastructure-oriented connection for mobile devices 101-103. Such sub-networks may include mesh networks, Wireless LAN (WLAN) networks, cellular networks, or the like.

Carrier network 104 may further include an autonomous system of terminals, gateways, routers, or the like connected by wireless radio links, or the like. These connectors may be configured to move freely and randomly and organize themselves arbitrarily, such that the topology of carrier network 104 may change rapidly.

Carrier network 104 may further employ a plurality of access technologies including, but not limited to, 2nd (2G), 3rd (3G) generation radio access for cellular systems, WLAN, Wireless Router (WR) mesh, or the like. Access technologies such as 2G, 3G, and future access networks may enable wide area coverage for mobile devices, such as mobile devices 101-103 with various degrees of mobility. For example, carrier network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, carrier network 104 may include virtually any wireless communication mechanism by which information may travel between mobile devices 101-103 and carrier gateways 106-107.

Carrier gateways 106-107 may include any computing device capable of connecting with mobile devices 101-103 to enable communications with another computing device, such as content providers 108-109, PCS 110, CCS 11, another mobile device, or the like. Such devices that may operate as carrier gateways 106-107 include, but are not limited to, personal computers, desktop computers, multiprocessor systems, microprocessor-based or programmable consumer electronics, network PCs, network appliances, servers, or the like.

Carrier gateways 106-107 typically include a carrier level service provider's computing device, and related infrastructure. Carrier gateways 106-107 may be configured to receive a network packet, or the like, from mobile devices 101-103. The network packet, or the like, may include information associated with mobile devices 101-103, such as a device identifier, or the like. The network packet may further include information associated with an end-user of mobile devices 101-103, such as a user account identifier, or the like. Carrier gateways 106-107 may include additional information in the network packet prior to sending the network packet towards another device, such as content providers 108-109, or the like. The additional information may include carrier information including, but not limited to, a carrier gateway grouping, carrier type, carrier identifier, carrier device's network address, or the like. Moreover, in one embodiment, carrier gateways 106-107 may select to hide information about the mobile devices sending a network packet. Thus, for example, in one embodiment, carrier gateways 106-107 may remove or modify information about the device identifier associated with the mobile devices 101-103. For example, in such situations, carrier gateways 106-107 may operate as a proxy server, a network address translation server, firewall, or the like, such that characteristics about the requesting mobile device might be hidden from the recipient of the request from the mobile devices 101-103.

Moreover, carrier gateways 106-107 represent examples of carrier gateways that may be implemented by different network carrier service providers. Furthermore, the network carrier service providers may select to add additional carrier gateways absent providing such indication to content providers 108-109, PCS 110, CCS 111, or the like. However, in one embodiment, a network carrier service provider may provide a registered network address for the added carrier gateway to content providers 108-109, or CCS 111, or the like. Moreover, as a network carrier service provider adds a new carrier gateway to system 100, the network carrier service provider will register a network address for the carrier gateway with a body, such as Internet Assigned Numbers Authority, (IANA), Internet Corporation for Assigned Names and Numbers (ICANN), or the like. The registered network address, may for example, include an Internet Protocol (IP) address, or similar, identifier.

Network 105 is configured to couple PCS 110, CCS 111, content providers 108-109, or the like, with carrier gateways 106-107. Network 105 is enabled to employ any firm of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between carrier gateways 106-107, and other networked devices, or the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of CCS 111 is described in more detail below in conjunction with FIG. 2. Briefly, however, CCS 111 may include any computing device capable of communicating with content providers 108-109. Such devices include personal computers, desktop computers, multiprocessor systems, microprocessor-based or programmable consumer electronics, network PCs, servers, or the like.

CCS 111 is configured to receive usage logs from content providers 108-109. Such usage logs may include for example, network addresses, or other information about a carrier gateway for which the content provider is unable to determine if mobile services are provided by that carrier gateway. CCS 111 may then determine through a variety of mechanisms described in more detail below, a likelihood that the carrier gateway does provide services to mobile devices. Moreover, CCS 111 may further determine a capability associated with the carrier gateway, such as whether it may be reasonable to attempt to deliver movies, or other high bandwidth content to a mobile device through the carrier gateway, including, but not limited to dynamic content, streaming content, news articles, or the like. Similarly, CCS 111 may provide similar indications about a capability of the carrier gateway, possibly with additional information about the carrier gateway, including, but not limited to a network carrier service provider's identity, or the like. In one embodiment, CCS 111 may then provide such information to a production service, such as PCS 110, or the like, from which content providers 108-109 may then obtain updates to their local information about the carrier gateways. In one embodiment, however, CCS 111 may also be configured to provide the information directly to one or more content providers 108-109.

As noted, PCS 110 is configured to receive and to provide information about carrier gateways. In one embodiment, PCS 110 may receive updates to carrier gateway information from CCS 111 on a periodic basis. However, PCS 110 may also request updates, and/or receive updates on a non-periodic basis. In one embodiment, PCS 110 may receive the updates through a push mechanism. However, in another embodiment, PCS 110 may receive the updates through a pull mechanism, or even through a combination of push/pull mechanisms. Moreover, PCS 110 may provide the update information about carrier gateways to content providers 108-109 using a push mechanism, a pull mechanism, or a combination of push/pull mechanisms. PCS 110 may employ one or more data stores to and/or from which the updates may be provided. It should be noted that although PCS 110 is illustrated as a single network device, the information is not so limited. For example, in one embodiment, PCS 110 may represent a plurality of network devices configured to receive and to provide updates to carrier gateway information.

Thus, PCS 110 may employ a peer-to-peer data store structure, a distributed structure, a clustering structure, or the like. Moreover, PCS 110 may be implemented using any of a variety of network devices including, but not limited to personal computers, desktop computers, multiprocessor systems, microprocessor-based or programmable consumer electronics, network PCs, servers, or the like.

Content providers 108-109 may include any computing device capable of communicating packets with another networked device. Each packet may convey a piece of information. A packet may be sent for handshaking, i.e., to establish a connection or to acknowledge receipt of data. The packet may include information such as a request, a response, or the like. Generally, packets received by content providers 108-109 will be formatted according to TCP/IP, but they could also be formatted using another transport protocol, such as SCTP, X.25, NetBEUI, IPX/SPX, token ring, similar IPv4/6 protocols, or any of a variety of protocols useable by a mobile device, such as mobile devices 101-103, or the like. Moreover, the packets may be communicated between content providers 108-109, and another networked device employing HTTP, HTTPS, or the like.

In one embodiment, content providers 108-109 are configured to operate as a website server. However, content providers 108-109 are not limited to web servers, and may also operate a messaging server, a File Transfer Protocol (FTP) server, a database server, content server, and the like. Additionally, each of content providers 108-109 may be configured to perform a different operation. Thus, for example, back-end server 108 may be configured as a messaging server, while back-end server 109 is configured as a database server. Moreover, while content providers 108-109 may operate as other than a website, they may still be enabled to receive an HTTP communication.

In addition, content providers 108-109 may be configured to provide content, and or other services based on a characteristic of a requesting device, a characteristic of a gateway device, a network characteristic, or the like. For example, content providers 108-109 may select to provide content at a different compression ratio for mobile devices, than for, say, for example, desktop computers, or the like. Moreover, content providers 108-109 may select to format content using a wireless application protocol (WAP) format, Handheld Device Markup Language (HDML) format, SMS format, Multimedia Messaging Service (MMS) format, or the like, for responses to request from mobile devices. Thus, in one embodiment, content providers 108-109 may seek to determine a capability and type of device, or gateway for which the request is associated.

In one embodiment, content providers 108-109 may employ a localized data store of information about carrier gateways, or the like. Content providers 108-109 may then examine the data store when it receives a request through a carrier gateway, or the like, to determine whether the requesting device is a mobile device, and/or what capabilities might the requesting device be able to support. In one embodiment, content providers 108-109 might receive a carrier gateway identifier, network address, or the like, with the request. Content providers 108-109 may then employ the carrier gateway identifier, network address, or the like, to make a determination about the requesting device. However, if content providers 108-109 are unable to locate the carrier gateway's identifier, network address, or the like, in its data store, content providers 108-109, may then select to refuse to provide a response to the request, to provide a degraded request, to send an error message in response, or any of a variety of other responses. Moreover, content providers 108-109 may include information about the carrier gateway in a usage log. Content providers 108-109 may then provide a copy of the usage log to CCS 111, and request/receive updates to their localized data stores from CCS 111, and/or PCS 110.

Devices that may operate as content providers 108-109 include personal computers desktop computers, multiprocessor systems, microprocessor-based or programmable consumer electronics, network PCs, servers, and the like.

Illustrative Server Environment

Figure 2:
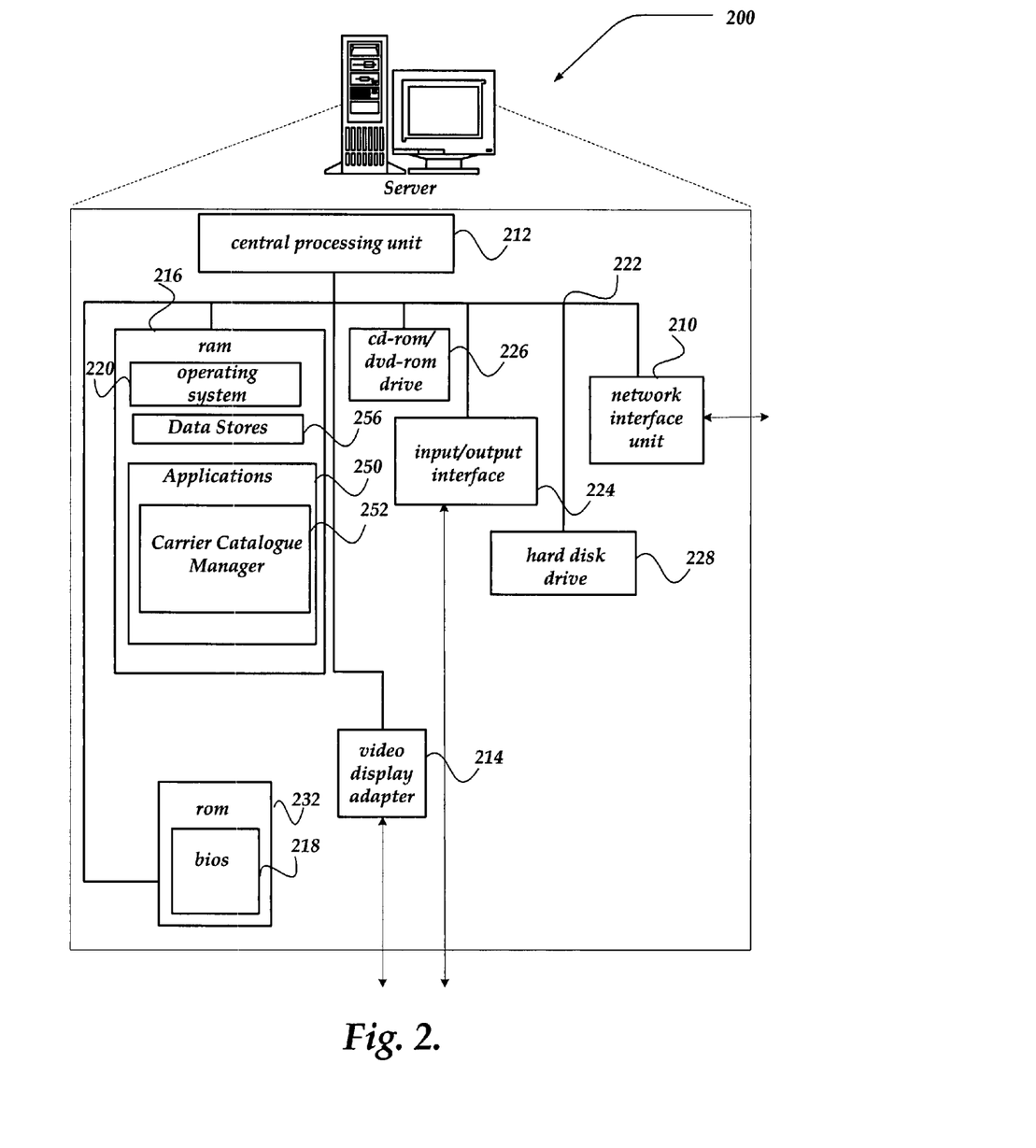
FIG. 2 shows one embodiment of a server device that may be included in a system implementing the invention.

FIG. 2 shows one embodiment of a server, according to one embodiment of the invention. Server 200 may include many more components than those shown. The components shown, however, are sufficient to disclose an illustrative embodiment for practicing the invention. Server 200 may represent, for example, CCS 111 of FIG. 1.

Server 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server 102. As illustrated in FIG. 2, server 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, or network interface card (NIC).

Server 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion.

Server 200 also includes input/output interface 224 for communicating with external devices, such as a mouse, keyboard, scanner, or other input devices not shown in FIG. 2. Likewise, server 200 may further include additional mass storage facilities such as CD-ROM/DVD-ROM drive 226 and hard disk drive 228. Hard disk drive 228 may be utilized to store, among other things, application programs, databases, registration information, messages, or the like.

The mass memory illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include mail programs, transcoder, schedulers, calendars, database programs, word processing programs, HTTP programs, HDML programs, SMS programs, IM programs, security programs, MMS programs, spreadsheet pro grams, and so forth. Mass storage may further include applications such as Carrier Catalogue Manager (CCM) 252, and data stores, such as data stores 256.

Data stores 256 are configured and arranged to receive and store event data, such as usage logs, or the like from various content providers. Data stores 256 may also receive and store information about various carrier gateways, network carrier service providers, or the like, from a variety of sources, including manual entries, third party feed consolidators, from network carrier service providers, or the like. Data stores 256 may be further configured to receive and to store likelihood information and/or capability information about a carrier gateway. In one embodiment, such information about carrier gateways may include, but is not limited to, network address information, domain names, or the like.

Data stores 256 may be implemented using a variety of schemes, including, but not limited to databases, flat files, spreadsheets, documents, XML documents, spreadsheets, or the like.

CCM 252 is configured to receive usage logs from various content providers, or the like, which include information about carrier gateways which may be unknown to the content provider, at least as to whether the carrier gateway provides services to mobile devices. CCM 252 may then employ information within the usage logs, to determine a percent likelihood that the carrier gateway does provide services to mobile devices. Moreover CCM 252 may further determine a capability of the carrier gateway, such as whether it is likely that the carrier gateway is capable of supporting streaming content, dynamic content, or other types of content and/or services. CCM 252 may then provide such determined information to a data store, such as data store 256, or the like, where the information may be then provided to the content providers. CCM 252 may employ a process substantially similar to that described below in conjunction with FIG. 4 to perform at least some of its actions.

Figure 3:
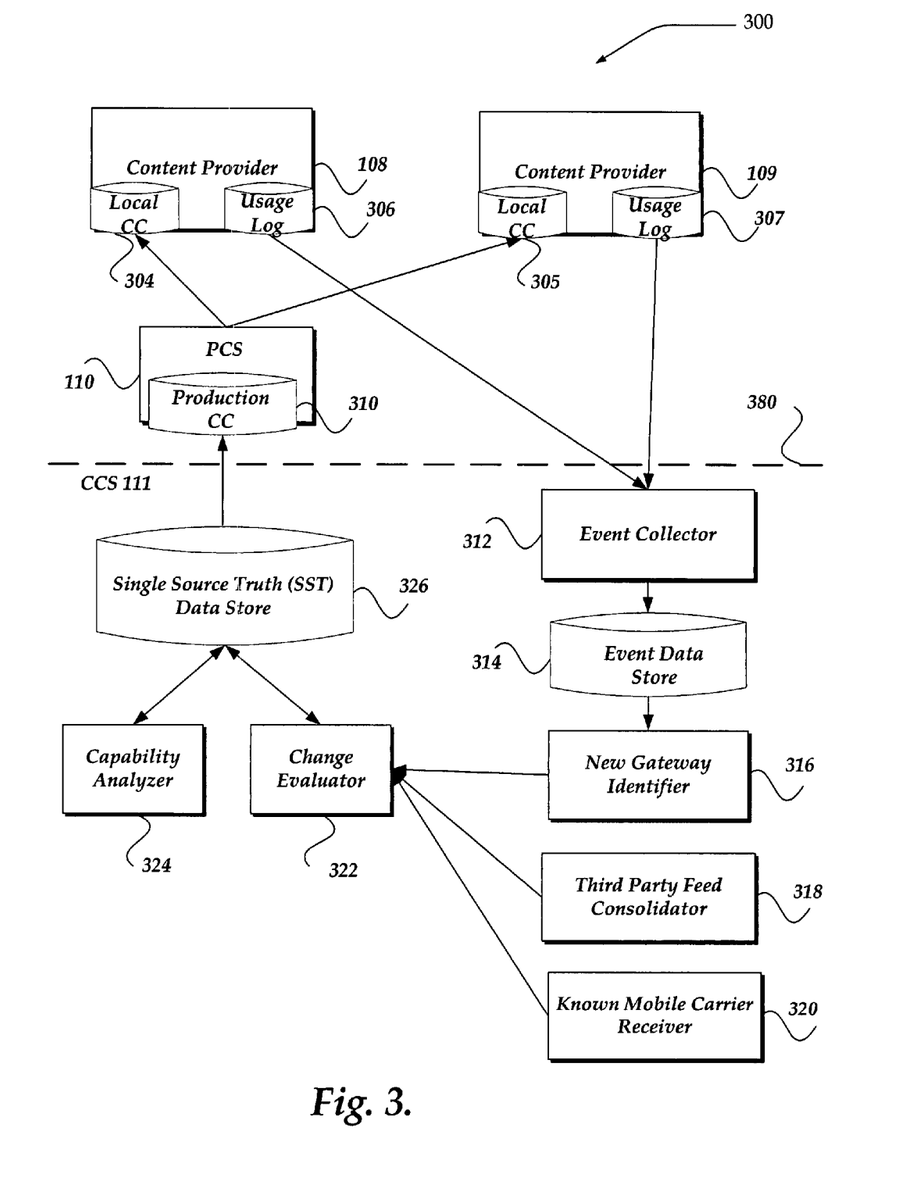
FIG. 3 shows a functional block diagram further illustrating one embodiment of various components within FIG. 1.

FIG. 3 shows a functional block diagram further illustrating one embodiment of various components within FIG. 1, in which some of the components may represent sub-components of CCM 252 of FIG. 2. Diagram 300 of FIG. 3 may include many more components than those shown. The components shown, however, are sufficient to disclose an illustrative embodiment for practicing the invention. As shown, however, event collector 312, new gateway identifier 316, third party feed consolidator 318, known mobile carrier (service provider) receiver 320, change evaluator 322, and capability analyzer 324 may be considered to represent, in one embodiment, components within CCM 252 of FIG. 2. Moreover, in one embodiment, Single Source Truth (SST) data store 326 and event data store 314 may represent possible data stores within data stores 256 of FIG. 2. However, the invention is not so limited, and other configurations, arrangements, or the like, may be employed. FIG. 3 is merely intended to represent one possible component arrangement, and is not intended to limit the scope of the invention.

In any event, as illustrated, components below dashed line 380 of FIG. 3 may be considered to be components within CCS 111, while components above dashed line 380 are components associated with PCS 110 and content providers 108-109 of FIG. 1.

Thus, as shown, content providers 108-109 may include their own localized carrier catalogues (CC) 304, and 305, respectively. Content providers 108-109 may also include usage logs 307-307, respectively. Updates to the localized CC 304-305 may be received and/or requested from PCS 110's production CC 310 (data store). Similarly, content providers 108-109 may provide a copy of their usage logs 306-307 to event collector 312.

Event collector 312 may then extract information associated with unknown carrier gateways, and provide at least that information to event data store 314. New Gateway identifier 316 may then attempt to determine a likelihood as to whether the unknown carrier gateway is associated with providing services to mobile devices.

New Gateway identifier 316 may make such determination based on a variety of criteria, using a variety of mechanisms. For example, in one embodiment, New Gateway identifier 316 may query another data store to determine with which network carrier service provider the unknown carrier gateway is associated. In one embodiment, New Gateway identifier 316 may be configured to perform a "whois" type query to a database, such as one supported by IANA, ICANN, or other known services. New Gateway identifier 316 may then receive information about the network carrier service provider. Based on the received information New Gateway identifier 316 may then determine a likelihood that the unknown carrier gateway provides mobile services. For example, New Gateway identifier 316 might use a whitelist, blacklist, or the like, that indicates if a particular network carrier service provider always does, or never provides mobile services. Additionally, in one embodiment, New Gateway identifier 316 may examine a name of a network domain, a name of the network carrier service provider, or the like, to attempt to determine a likelihood. For example, where a domain name includes a phrase such as DSL, New Gateway identifier 316 may determine that there is a low likelihood that the unknown carrier gateway provides mobile services. In such instance, the percent likelihood might be set to zero percent. Similarly, where the network carrier service provider's name is known to also provide mobile services, perhaps along with other non-mobile services, the percent likelihood might be set to a higher value, such as between 70-90%, or the like. However, it should be noted that other likelihood values may also be selected. Thus, examination of various received information about the network address of the unknown carrier gateway, a determined network domain, a determined name of the network carrier service provider, or the like, may result in a percent likelihood that the carrier gateway provides mobile services. Values percentages provide levels of confidence in the determination of the carrier gateway's services. In one embodiment, a threshold value may be selected over which, a high level of confidence may be given that about the determination. Under the threshold value, there may be a low level of confidence that the carrier gateway provides mobile services. Such threshold value may be set to any of a variety of values. For example, the threshold may be set between 70-80%; however, other values may also be used, based on a number of desired false-positives, content provider feedback, or the like.

In any event, New Gateway identifier 316 may then provide its determinations to change evaluator 322. Change evaluator 322 may also receive inputs from third party feed consolidator 318, and/or known mobile carrier receivers 320.

Third party feed consolidator 318 is configured to receive inputs from a variety of sources about network carrier service providers, carrier gateways, or the like. Such information may include, for example, network addresses for a carrier gateway, an associated network carrier service provider, capabilities of the carrier gateway, whether the carrier gateway provides mobile services, or the like.

Known mobile carrier receiver 320 includes inputs from known network carrier service providers, including known mobile service providers, or the like. Similarly, such information may include, for example, network addresses for a carrier gateway, an associated network carrier service provider, capabilities of the carrier gateway, whether the carrier gateway provides mobile services, or the like.

Change evaluator 322 may receive information from third party feed consolidator 318, known mobile carrier receiver 320, and/or new gateway identifier 316 asynchronously. For example, in one embodiment, known mobile carrier receivers 320 might be configure to provide inputs to change evaluator 322 weekly, monthly, or the like, while new gateway identifier 316 might be configured to provide its inputs hourly, daily, or the like. However, such frequencies should be considered as possible examples, and the invention is not constrained to such examples, or in receiving the inputs asynchronously. Thus, for example, the inputs may be received from the various sources synchronously, without departing from the scope of the invention.

Change evaluator 322 may then employ the various inputs to determine additional likelihoods, modify likelihoods determined by new gateway identifier 316, or the like. For example, if known mobile carrier receiver 320 receives input indicating that a carrier gateway does provide mobile services, while new gateway identifier 316, determined with 75% or so, that the carrier gateway does, then change evaluator 322 might modify the likelihood for that carrier gateway to 100%, or so. In any event, change evaluator 322 may then provide its results to SST 326.

Capability analyzer 324 may examine the information within SST 326, including a determined likelihood, or the like, and provide a capability assessment to the information for the carrier gateway. For example, where a content provider, or other source, has indicated that likelihoods below a particular value indicates possible poor mobile services, capability analyzer 324 may include information indicating that this carrier gateway might not want to be used for sending dynamic content, steaming content, or similar high bandwidth content or services. Capability analyzer 324 may also examine information about the associated network carrier service provider to make such determinations.

Moreover, Capability analyzer 324 may also examine various other aspects of the carrier gateway, network carrier service provider, or the like, to determine whether a degraded service might be provided to requests from that carrier gateway for various content providers. For example, it may be determined from the capability that the carrier gateway is associated with a non-compliant carrier gateway, non-complaint network carrier service provider, a network carrier service provider in which a service level agreement indicates a lower level of service is to be provided, a network carrier service provider for which the content provider would prefer to provide a degraded performance, or the like. In such instances, the content provider may then select to degrade a performance, a quality of content, or the like, in response to a request from that carrier gateway. In any event, capability analyzer 324 may then update the information in SST 326 with its capability information.

SST data store 326 may then operate as a single source of truth for information about the previously unknown carrier gateways. SST data store 326 may provide at least some of its stored information, including the likelihood information, capability information, or the like, for a carrier gateway to PCS 110. Similarly, SST data store 326 may be configured to provide such information to content providers 108-109, without departing from the scope of the invention.

Generalized Operation

Figure 4:
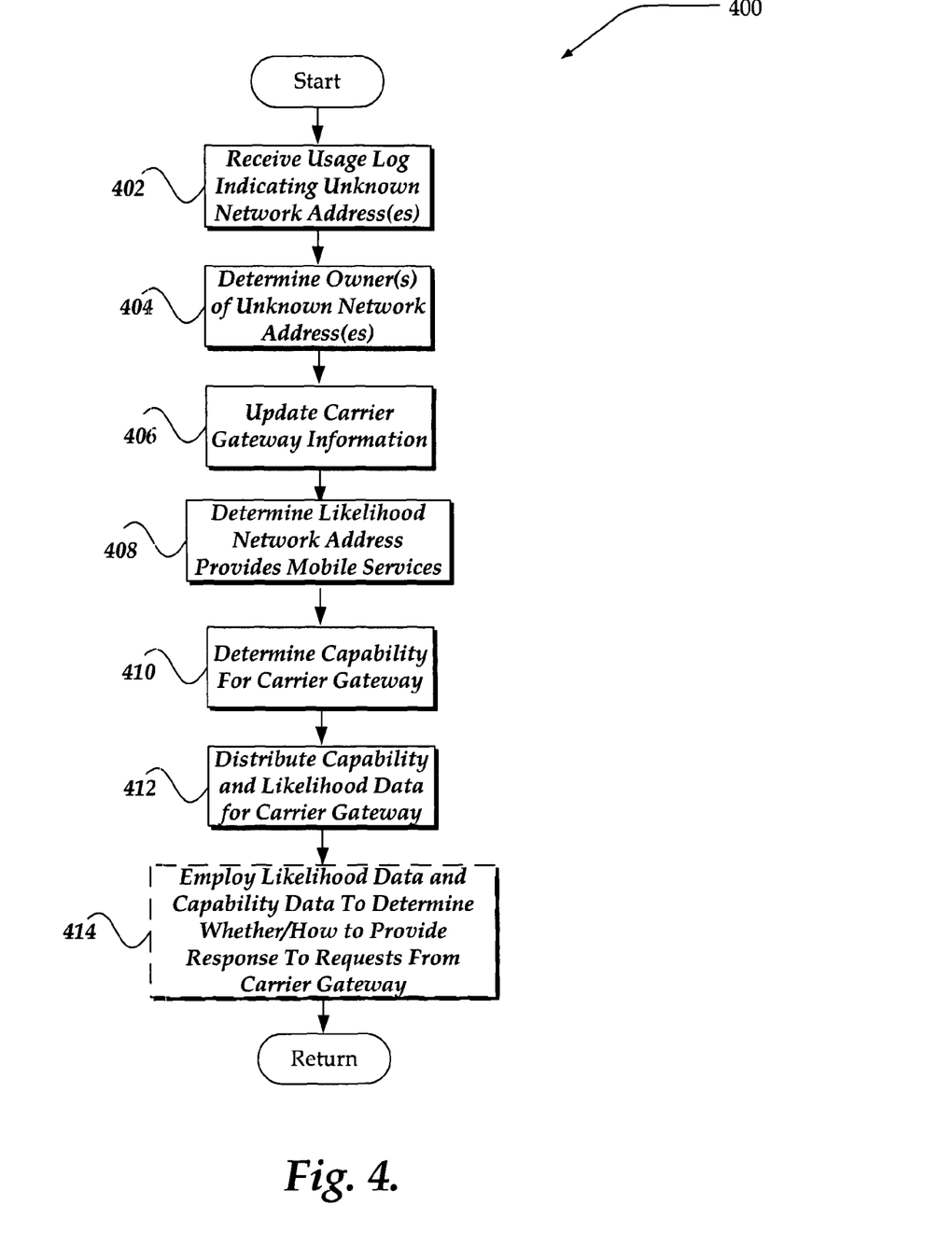
FIG. 4 illustrates one embodiment of a logical data flow of a process for managing mobile carrier determinations and capabilities, in accordance with the present invention.

The operation of certain aspects of the present invention will now be described with respect to FIG. 4. FIG. 4 illustrates one embodiment of a logical data flow of a process for managing carrier gateway determinations and capabilities, in accordance with the present invention. Process 400 of FIG. 4 may be implemented within CCS 111 of FIG. 1, for example.

Process 400 begins, after a start block, at block 402, where usage logs are received. Such usage logs include information about a carrier gateway that may be unknown to a content provider, or the like. The information may include a network address for the unknown carrier gateway, such as an IP address, or the like.

Process 400 continues next to block 404, where an owner (network carrier service provider) is determined for the network address. As stated above, in one embodiment, such information may be obtained through a whois query. However, other queries may also be performed. In one embodiment, the queries may be performed during an offline process; however, the invention is not so limited. Thus, in another embodiment, the queries may also be performed online or virtually in real-time. Processing flows next to block 406 where information about the carrier gateway is then updated based on the query, including a domain name, the determined network carrier service provider, and/or any other information that may be obtained by one or more queries.

Continuing next to block 408, a determination of a percent likelihood is made based on various characteristics of the information obtained in at least block 406, such as is described above in conjunction with FIG. 3. Process 400 next flows to block 410, where a capability of for the carrier gateway may be determined, such as is described above. Flowing next to block 412, the information about the carrier gateway, including the likelihood that the carrier gateway provides mobile services, its capability, or the like, is distributed to content providers, or the like.

Processing flows next to block 414, which may be performed by the content providers (as indicated by the dashed box). At block 414, the information about the carrier gateway may be used to determine how to respond to a request from the carrier gateway for content and/or services. Thus, if it is likely (greater than a determined threshold) that the carrier gateway provides mobile services, the requested services and/or content may be formatted for use with a mobile device. For example, the content might be formatted from HTML format to HDML format, or the like. Moreover, the capability of the carrier gateway might be used to determine whether to send the content/services requested. For example, in one embodiment, if it is determined that the carrier gateway might not be capable of supporting mail services, then an error message, or degraded response might be provided. In any event, the content providers may employ the capability information in a variety of ways. For example, if the capability indicates that the carrier gateway is able to receive streaming content, then the content provider may provide streaming content, or the like, in response to a request.

Moreover, in one embodiment, the capability information, and or other information about the carrier gateway may indicate that the response should be a degraded response. For example, it may be determined from the capability that the carrier gateway is associated with a non-compliant carrier gateway, non-complaint network carrier service provider, a network carrier service provider in which a service level agreement indicates a lower level of service is to be provided, a network carrier service provider for which the content provider would prefer to provide a degraded performance, or the like. In such instances, the content provider may then select to degrade a performance, a quality of content, or the like, in response to a request from that carrier gateway. In one embodiment, the content provider may even select to provide an error message, or no response, to the request. Processing then returns, after block 414, to a calling block to perform other actions.

As noted above, in one embodiment, several actions may be performed online, while others may be performed offline. Thus, in one embodiment, whois or similar queries might be performed offline, while other actions, such as determining a likelihood of an IP to network carrier service provider mapping might be done online. However, the information is not limited to such actions being performed as described. Thus, in another embodiment, all the actions may be performed online, or all offline, or any other combination, without departing from the scope of the invention. For example, whois or similar queries may be performed online.

It will be understood that each block of the flowchart illustration, and combinations of blocks in the flowchart illustration, can be implemented by computer program instructions.

These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method operating on one or more network devices configured for use in managing delivery of content over a network, comprising:
   receiving a network address of an unknown carrier gateway, wherein the unknown carrier gateway is a carrier gateway that is unknown as to whether the carrier gateway is configured to provide services to a mobile device;
   determining information about a network carrier service provider associated with the network address;
   determining a percent likelihood that the unknown carrier gateway is configured to provide services to a mobile device based on the determined information about the network carrier service provider;
   determining a capability for the unknown carrier gateway based on the likelihood and the information about the network carrier service provider;
   receiving a request for content from the unknown carrier gateway;
   determining a response to the request based, in part, on the capability, the percent likelihood that the unknown carrier gateway is configured to provide services to a mobile device, and the information about the network carrier service provider; and
   providing the determined response to the unknown carrier gateway.

2. The method of claim 1, wherein determining the response further comprises if the percent likelihood is above a threshold value, then providing the response in a format useable by a mobile device.

3. The method of claim 1, wherein determining the response further comprises if the percent likelihood is below a threshold value, providing a degraded performance in response to the request.

4. The method of claim 1, wherein determining information about a network carrier service provider associated with the network address further comprises employing a whois query to determine the information.

5. The method of claim 1, wherein determining a percent likelihood that the unknown carrier gateway is configured to provide services to a mobile device further comprises, examining at least one of a name of the network carrier service provider, a whitelist, a blacklist, or a network domain, to determine the percent likelihood.

6. The method of claim 1, wherein determining information about a network carrier service provider further comprises receiving information from at least one of the network carrier service provider, or a third party feed consolidator.

7. The method of claim 1, wherein receiving a network address further comprises receiving a usage log from a network device.

8. A network device for managing delivery of content over a network, comprising:
   a transceiver to send and receive data over the network; and
   a processor that is operative to perform actions, including:
      receiving a network address of an unknown carrier gateway, wherein the unknown carrier gateway is a carrier gateway that is unknown as to whether the carrier gateway is configured to provide services to a mobile device;
      determining information about a network carrier service provider associated with the network address;
      determining a percent likelihood that the unknown carrier gateway is configured to provide services to a mobile device based on the determined information about the network carrier service provider;
      determining a capability for the unknown carrier gateway based on the likelihood and the information about the network carrier service provider; and
      providing the capability, percent likelihood, and information about the network carrier service provider to a content provider, such that the content provider may provide a response to a request for content from the carrier gateway.

9. The network device of claim 8, wherein determining a percent likelihood that the unknown carrier gateway is configured to provide services to a mobile device further comprises, examining at least one of a name of the network carrier service provider, a whitelist, a blacklist, or a network domain, to determine the percent likelihood.

10. The network device of claim 8, wherein determining information about a network carrier service provider associated with the network address further comprises employing a whois query to determine the information.

11. The network device of claim 8, wherein the content provider may provide the response reformatted for a mobile device based in part, on the percent likelihood exceeding a defined threshold.

12. The network device of claim 8, wherein the content provider provides a degraded response to the unknown carrier gateway based in part on the capability for the unknown carrier gateway.

13. The network device of claim 8, wherein the determined capability for the unknown carrier gateway indicates that the carrier gateway is likely to be able to support one format of content, while likely to be unable to support at least one other format of content.

14. The network device of claim 8, wherein the network device is configured to push the capability, percent likelihood, and information about the network carrier service provider to a content provider.

15. A system for use in selectively enabling delivery of content over a network, comprising:
   a carrier catalogue service that is configured and arranged to perform actions, including:
      receiving a network address of an unknown carrier gateway, wherein the unknown carrier gateway is a carrier gateway that is unknown as to whether the carrier gateway is configured to provide services to a mobile device;

determining information about a network carrier service provider associated with the network address;

determining a percent likelihood that the unknown carrier gateway is configured to provide services to a mobile device based on the determined information about the network carrier service provider;

determining a capability for the unknown carrier gateway based on the likelihood and the information about the network carrier service provider; and providing the capability, percent likelihood, and information about the network carrier service provider and unknown gateway over the network; and a content provider that is configured and arranged to perform actions, including:

receiving a request for content from the unknown carrier gateway;

providing the network address to the carrier catalogue service;

receiving capability, percent likelihood, and information about the network carrier service provider; and employing at least one of the capability, percent likelihood, or information about the network carrier service provider to determine a response to the request from the unknown carrier gateway; and providing the determined response to the unknown carrier gateway.

16. The system of claim 15, wherein determining the response further comprises determining that the response is a degraded response.

17. The system of claim 15, wherein determining the response further comprises providing the response in a format useable by a mobile device.

18. The system of claim 15, determining a percent likelihood further comprises examining at least one characteristic of a network domain name associated with the unknown carrier gateway to determine the percent likelihood.

19. The system of claim 15, wherein employing at least one of the capability or information about the network carrier service provider, further comprises examining a service level agreement with the network carrier service provider, in part, to determine the response.

20. The method of claim 1, wherein the network address is received with the request for content from the unknown carrier gateway.

* * * * *

UNITED STATES PATENT AND TRADEMARK OFFICE
CERTIFICATE OF CORRECTION

| | | |
|---|---|---|
| PATENT NO. | : 8,010,087 B2 | Page 1 of 1 |
| APPLICATION NO. | : 11/894483 | |
| DATED | : August 30, 2011 | |
| INVENTOR(S) | : Venkata Narasimha Rao Yerubandi et al. | |

It is certified that error appears in the above-identified patent and that said Letters Patent is hereby corrected as shown below:

On the Title Page, in field (56), under (Other Publications), in column 2, line 2, delete "http;" and insert -- http: --, therefor.

On the Title Page, in field (56), under (Other Publications), in column 2, line 3, delete "http;" and insert -- http: --, therefor.

On the Title Page, in field (56), under (Other Publications), in column 2, line 5, delete "mobilernarketinginthenews" and insert -- mobilemarketinginthenews --, therefor.

Signed and Sealed this
Twenty-second Day of November, 2011

David J. Kappos
*Director of the United States Patent and Trademark Office*